United States Patent
Tsukui et al.

(10) Patent No.: US 12,044,460 B2
(45) Date of Patent: Jul. 23, 2024

(54) COLD STORAGE

(71) Applicant: PHC Corporation, Ehime (JP)

(72) Inventors: Nobuyuki Tsukui, Gunma (JP); Eiichi Mori, Ehime (JP); Eiji Doi, Ehime (JP)

(73) Assignee: PHC CORPORATION, Ehime (JP)

( * ) Notice: Subject to any disclaimer, the term of this patent is extended or adjusted under 35 U.S.C. 154(b) by 247 days.

(21) Appl. No.: 17/674,099

(22) Filed: Feb. 17, 2022

(65) Prior Publication Data

US 2022/0170688 A1 Jun. 2, 2022

Related U.S. Application Data (63) Continuation of application No. PCT/JP2020/030916, filed on Aug. 14, 2020.

(30) Foreign Application Priority Data

Aug. 27, 2019 (JP) ................................. 2019-154912

(51) Int. Cl.
F25D 23/02 (2006.01)

(52) U.S. Cl.
CPC ......... *F25D 23/021* (2013.01); *F25D 23/028* (2013.01)

(58) Field of Classification Search
CPC .... F25D 23/021; F25D 23/028; F25D 23/087; A47F 3/043; Y02E 60/14; E06B 3/46; E06B 3/52

See application file for complete search history.

(56) References Cited

U.S. PATENT DOCUMENTS

| | | | | |
|---|---|---|---|---|
| 3,583,101 A | * | 6/1971 | Pudenz | E06B 3/4636 160/90 |
| 4,936,049 A | * | 6/1990 | Hansen | E06B 3/4618 49/235 |
| 11,547,211 B2 | * | 1/2023 | Hoffmann | A47B 88/483 |

FOREIGN PATENT DOCUMENTS

| | | | | | |
|---|---|---|---|---|---|
| CN | 103355998 A | * | 10/2013 | | |
| CN | 106642900 A | * | 5/2017 | | |
| CN | 109469424 A | * | 3/2019 | ......... | E06B 3/26303 |
| EP | 2685039 A2 | * | 1/2014 | ............. | E05D 15/06 |
| JP | 05-066494 U | | 9/1993 | | |
| JP | H0566494 U | * | 9/1993 | | |
| JP | H0566495 U | * | 9/1993 | | |
| JP | 2547622 Y2 | * | 9/1997 | | |

(Continued)

OTHER PUBLICATIONS

International Search Report and Written Opinion issued in International Patent Application No. PCT/JP2020/030916, dated Oct. 20, 2020; with partial English translation.

*Primary Examiner* — Hanh V Tran
(74) *Attorney, Agent, or Firm* — Rimon P.C.

(57) ABSTRACT

Provided is a cold storage including: a sliding door; a lower frame for guiding a lower side of the sliding door, the lower frame having a recessed part; an upper frame for guiding an upper side of the sliding door; and a first sealing member having a first attachment part, which is a portion attached to the sliding door, and a first tip-end. A cross-sectional shape of the first sealing member is an arcuate shape. The first attachment part is located at the uppermost side of the first sealing member. The first tip-end is located at the lowermost side of the first sealing member. When a wheel of the sliding door drops into the recessed part, an outer peripheral surface of the first sealing member is brought into close contact with the upper frame or the lower frame.

3 Claims, 4 Drawing Sheets

(56) References Cited

FOREIGN PATENT DOCUMENTS

| JP | 2007113885 A | * | 5/2007 | |
|----|---|---|---|---|
| JP | 2008-057265 A | | 3/2008 | |
| JP | 2008057265 A | * | 3/2008 | |
| JP | 5448664 B2 | * | 3/2014 | |
| JP | 5448664 B2 | | 3/2014 | |
| JP | 2017089318 A | * | 5/2017 | ......... E05D 15/0669 |
| JP | 2021018027 A | * | 2/2021 | |
| KR | 101044803 B1 | * | 6/2011 | |
| KR | 101398112 B1 | * | 5/2014 | |
| KR | 20150120648 A | * | 10/2015 | |
| KR | 101581295 B1 | * | 1/2016 | |
| KR | 20170006918 A | * | 1/2017 | |
| KR | 102095775 B1 | * | 4/2020 | |
| WO | WO-0118469 A1 | * | 3/2001 | ......... E05D 15/1021 |
| WO | WO-2007139354 A1 | * | 12/2007 | ......... E05D 15/1013 |
| WO | WO-2022190734 A1 | * | 9/2022 | ............ F25D 21/14 |

* cited by examiner

COLD STORAGE

CROSS-REFERENCE OF RELATED APPLICATIONS

This application is a Continuation of International Patent Application No. PCT/JP2020/030916, filed on Aug. 14, 2020, which in turn claims the benefit of Japanese Application No. 2019-154912, filed on Aug. 27, 2019, the entire disclosures of which Applications are incorporated by reference herein.

TECHNICAL FIELD

The present disclosure relates to a refrigerator including a sliding door.

BACKGROUND ART

PTL 1 discloses a cooling storage as a cold storage apparatus that stores an object under a low temperature environment, for example. The cooling storage disclosed in PTL 1 includes a slide door including a roller, and when the slide door moves on a rail to a fully closed position, the roller is lowered into a recess formed in the rail. At this time, the packing of the slide door is pressed against the opening edge of the cooling storage while being elastically compressed, and thus the opening is sealed.

CITATION LIST

Patent Literature

PTL 1
Japanese Patent Publication No. 5448664

SUMMARY OF INVENTION

Technical Problem

However, the sealing structure including the packing and the opening edge of the cooling storage in PTL 1 is insufficient in terms of the function. Therefore, improvement in the function of the sealing structure of the cooling storage is desired.

An object of the present disclosure is to provide a refrigerator including a highly functional sealing structure.

Solution to Problem

A refrigerator according to the present disclosure includes: a sliding door including a wheel; a lower frame including a lowering part into which the wheel is lowered, the lower frame being configured to guide a lower side of the sliding door; an upper frame configured to guide an upper side of the sliding door; and a first sealing member including a first attaching part and a first end part, the first attaching part being a portion attached to the sliding door. A cross-sectional shape of the first sealing member taken along a plane perpendicular to a movement direction of the sliding door is an arch shape. The first attaching part is located on an uppermost side in the first sealing member. The first end part is located on a lowermost side in the first sealing member. When the wheel is lowered in the lowering part, an outer peripheral surface of the first sealing member makes intimate contact with the upper frame or the lower frame.

Advantageous Effects of Invention

According to the present disclosure, it is possible to provide a refrigerator including a highly functional sealing structure.

DESCRIPTION OF EMBODIMENTS

An embodiment of the present disclosure is elaborated below with reference to the accompanying drawings. Note that the embodiment described below is merely an example, and the present disclosure is not limited to the embodiment.

Figure 1:
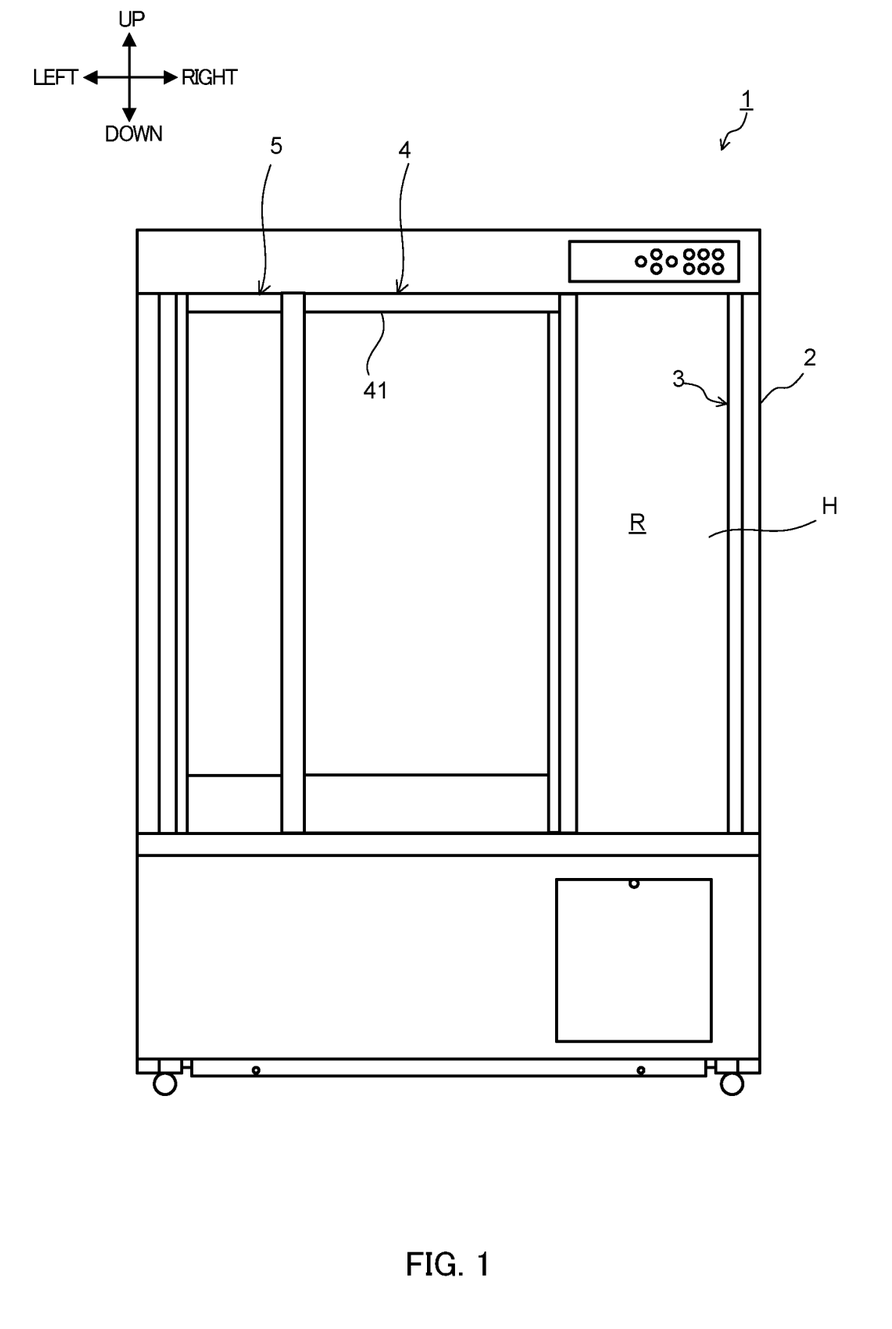
FIG. 1 is a front view of a refrigerator according to the present disclosure.
Figure 2:
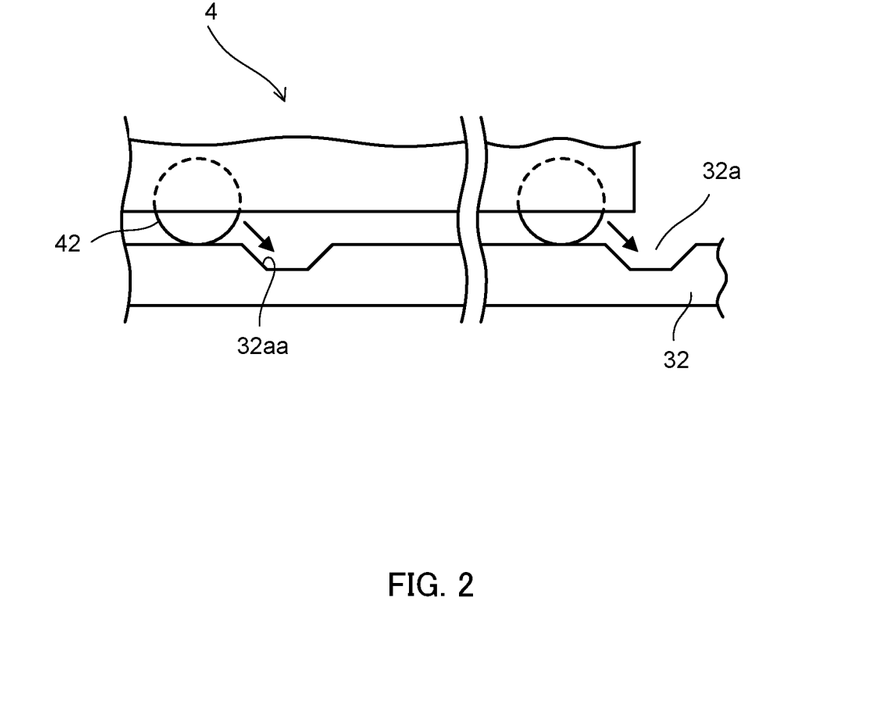
FIG. 2 is a schematic view for describing an operation of lowering a sliding door of the refrigerator according to the present disclosure.
Figure 3:
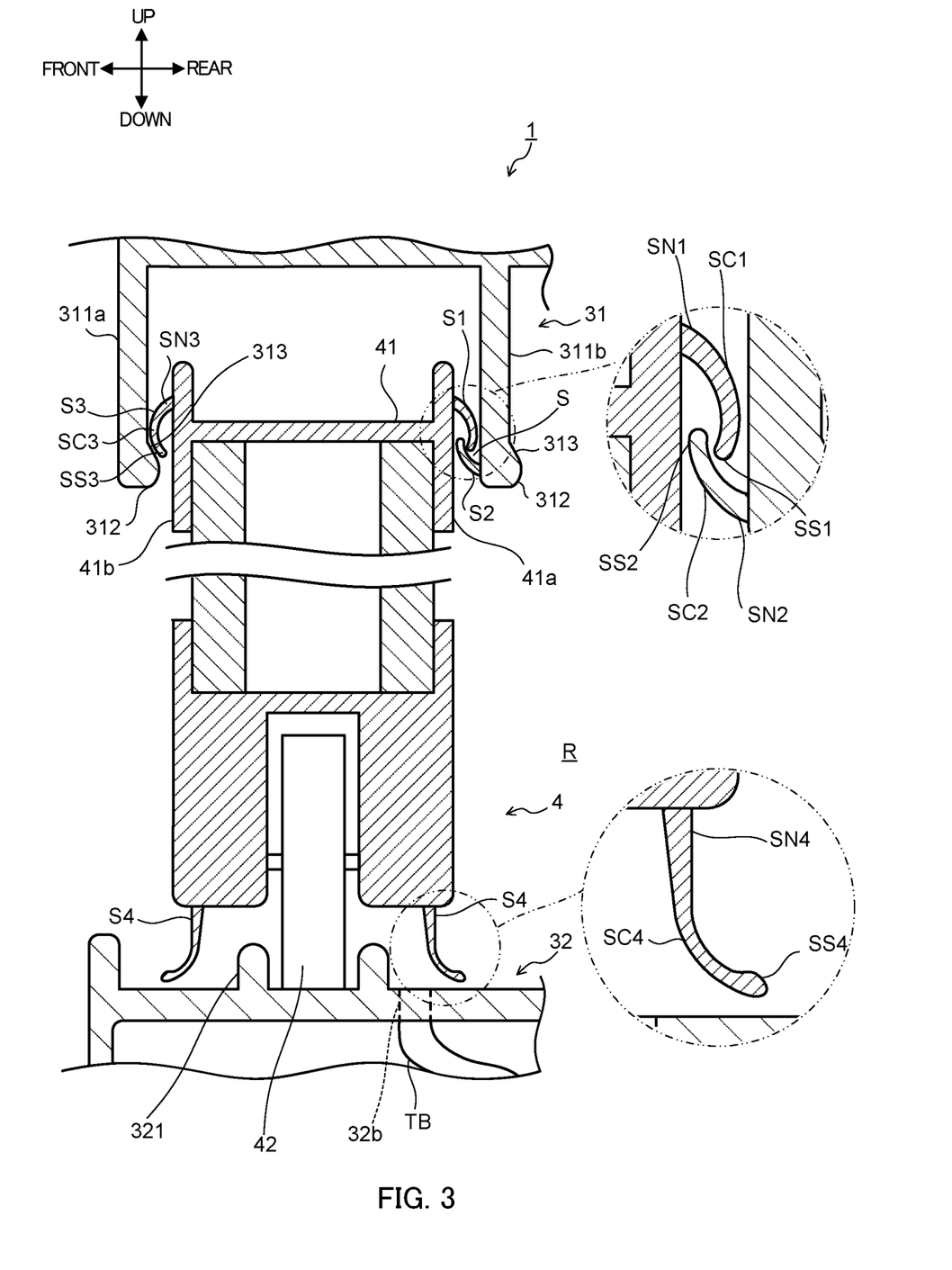
FIG. 3 is a cross-sectional view of the refrigerator according to the present disclosure, in a state where the sliding door is located at an open position.

First, a configuration of refrigerator 1 is described with reference to FIGS. 1, 2, and 3. FIG. 1 is a front view of refrigerator 1 according to the present disclosure. FIG. 1 illustrates a state where outer sliding door 4 described later is at an open position and inner sliding door 5 is at a fully closed position. FIG. 2 is a schematic view for describing an operation of lowering outer sliding door 4 of refrigerator 1 according to the present disclosure. FIG. 3 is a cross-sectional view of refrigerator 1 according to the present disclosure, in the state where outer sliding door 4 is at an open position. Here, the cross section is a cross section taken along a plane (hereinafter referred to as vertical plane) perpendicular to the movement direction of outer sliding door 4. Note that refrigerator 1 of the present embodiment is, for example, a medicine refrigerator for storing pharmaceutical drugs. In addition, in the present specification, the front side of refrigerator 1 is the side facing the user using it (the side on which outer sliding door 4 and inner sliding door 5 are provided), and the side opposite to the front side is the rear side of refrigerator 1. In addition, the left side and the right side as viewed from the front side are the left side and the right side of refrigerator 1.

Refrigerator 1 includes housing 2, frame body 3, outer sliding door 4, and inner sliding door 5.

Opening H is formed in the front surface of housing 2. A heat insulation material is provided between the outer peripheral surface and the inner peripheral surface of housing 2. The space surrounded by the inner peripheral surface of housing 2 is refrigeration compartment R, which is a space for housing an object (see FIG. 1). In addition, the internal space on the lower side of refrigeration compartment R in housing 2 is a machine compartment. Refrigeration compartment R and machine compartment are parted. A compressor, a condenser and the like making up a refrigeration circuit that cools refrigeration compartment R are disposed in the machine compartment.

Frame body 3 is provided in housing 2 to surround opening H. Frame body 3 includes upper frame 31 and lower frame 32.

Upper frame 31 guides the upper side of outer sliding door 4 and inner sliding door 5 in the horizontal direction, i.e., the opening closing direction. Upper frame 31 includes drooped parts 311a and 311b and protruding part 312. Drooped part 311a is located on the front side than outer sliding door 4, and drooped part 311b is located on refrigeration compartment R side than outer sliding door 4 and on the front side than inner sliding door 5. Although not illustrated in the drawing, upper frame 31 includes a drooped part (hereinafter referred to as innermost drooped part) on the refrigeration compartment R side than inner sliding door 5. Note that auxiliary sealing member S2 described later is attached to drooped part 311b and the innermost drooped part.

Drooped part 311a and drooped part 311b include protruding part 312 protruding toward outer sliding door 4 and inner sliding door 5. Guiding surface 313 is formed in protruding part 312.

Lower frame 32 includes sliding door guide part 321. In the front-rear direction, sliding door guide part 321 is formed between drooped part 311a and drooped part 311b, and between drooped part 311b and the innermost drooped part. Lower frame 32 guides the lower side of inner sliding door 5 and outer sliding door 4 disposed in sliding door guide part 321 in the horizontal direction, i.e., the opening closing direction.

In addition, lowering part 32a and guiding port 32b are formed in lower frame 32. Lowering part 32a is elaborated later. Guiding port 32b, which is located between sliding door guide part 321 and a portion where downward sealing member S4 described later makes intimate contact in lower frame 32, guides condensation water generated at frame body 3 or outer sliding door 4 into the machine compartment.

In the fully opened state, inner sliding door 5 is located between outer sliding door 4 and refrigeration compartment R. Since outer sliding door 4 and inner sliding door 5 have the same configuration, the configuration of outer sliding door 4 is described below, and the description of inner sliding door 5 is omitted. Note that the opening direction and the closing direction of outer sliding door 4 correspond to the left direction and the right direction, respectively, and the opening direction and the closing direction of inner sliding door 5 correspond to the right direction and the left direction, respectively.

Outer sliding door 4 includes sash 41 and wheel 42. Sash 41 holds a glass layer. In addition, at sash 41, upward inner sealing member S1, upward outer sealing member S3 and downward sealing member S4 described later are attached. 41a and 41b in FIG. 3 are the inner surface and the outer surface of outer sliding door 4. Outer surface 41b is a surface on the outside (forward side) of refrigeration compartment R, and inner surface 41a is a surface on the refrigeration compartment R side (rear side).

Wheel 42 is attached on the lower side of outer sliding door 4. As outer sliding door 4 moves, wheel 42 rotates, and as a result outer sliding door 4 smoothly moves along sliding door guide part 321.

Wheel 42 is lowered into lowering part 32a when outer sliding door 4 moves to the fully closed position. Lowering part 32a is a recess where wheel 42 fits. Lowering part 32a includes tilted surface 32aa on the closing direction side of outer sliding door 4. When wheel 42 is being lowered, tilted surface 32aa guides wheel 42 in an obliquely downward direction. In this manner, when outer sliding door 4 is moved to an open position close to the fully closed position, outer sliding door 4 moves to the fully closed position even when outer sliding door 4 is not moved by the user in the closing direction from the open position.

Refrigerator 1 of the present embodiment includes upward inner sealing member S1, auxiliary sealing member S2, upward outer sealing member S3, and two downward sealing members S4. As illustrated in FIG. 3, the cross-sectional shape taken along the vertical plane of each of upward inner sealing member S1, auxiliary sealing member S2, upward outer sealing member S3, and downward sealing member S4 is an arch shape. In addition, upward inner sealing member S1, upward outer sealing member S3, and downward sealing member S4 are attached to outer sliding door 4, and extended from the right end to the left end of outer sliding door 4. Auxiliary sealing member S2 is attached to drooped part 311b, and extended from the right end to the left end of upper frame 31.

Upward inner sealing member S1 (an example of the first sealing member) includes attaching part SN1, end part SS1, and curved part SC1. Attaching part SN1 is an end part on one side of upward inner sealing member S1 in the vertical plane, and is attached to inner surface 41a of outer sliding door 4. End part SS1 is an end part on the side opposite to attaching part SN1 in the vertical plane. Curved part SC1 connects attaching part SN1 and end part SS1.

Upward inner sealing member S1 is located between outer sliding door S1 and drooped part 311b such that attaching part SN1 is located on the uppermost side in upward inner sealing member S1 and that end part SS1 is located on the lowermost side in upward inner sealing member S1.

Auxiliary sealing member S2 (an example of the second sealing member) includes attaching part SN2, end part SS2, and curved part SC2. Attaching part SN2 is an end part on one side of auxiliary sealing member S2 in the vertical plane, and is attached to drooped part 311b. End part SS2 is an end part on the side opposite to attaching part SN2 in the vertical plane. Curved part SC2 connects attaching part SN2 and end part SS2.

Auxiliary sealing member S2 is located between outer sliding door S2 and drooped part 311b such that attaching part SN2 is located on the lowermost side in auxiliary sealing member S2 and that end part SS2 is located on the uppermost side in auxiliary sealing member S2. In addition, end part SN2 is closer to outer sliding door 4 than end part SN1.

Upward outer sealing member S3 (first sealing member an example) includes attaching part SN3, end part SS3, and curved part SC3. Attaching part SN3 is an end part on one side of upward outer sealing member S3 in the vertical plane, and is attached to outer surface 41b of outer sliding door 4. End part SS3 is an end part on the side opposite to attaching part SN3 in the vertical plane. Curved part SC3 connects attaching part SN3 and end part SS3.

Upward outer sealing member S3 is located between outer sliding door S3 and drooped part 311a such that attaching part SN3 is located on the uppermost side in upward outer sealing member S3 and that end part SS3 is located on the lowermost side in upward outer sealing member S3. Note that protruding part 312 is located on lower side than the end part of SS3 of upward outer sealing member S3 in drooped part 311a.

Downward sealing member S4 (an example of the first sealing member) is a bottom surface of outer sliding door 4, and is attached to two portions on the rear side and the front side than sliding door guide part 321. Downward sealing member S4 includes attaching part SN4, end part SS4, and curved part SC4. Attaching part SN4 is an end part on one side of downward sealing member S4 in the vertical plane, and is attached to outer sliding door 4. End part SS4 is an end part on the side opposite to attaching part SN4 in the vertical plane. Curved part SC4 connects attaching part SN4 and end part SS4. Here, end part SS4 has a swelled shape, and, in a cross-section taken along the vertical plane, the size from the inner peripheral surface of downward sealing member S4 to the outer peripheral surface of downward sealing member S4 is larger at end part SS4 than at curved part SC4.

Downward sealing member S4 is located between outer sliding door S4 and lower frame 32 such that attaching part SN4 is located on the uppermost side in downward sealing member S4 and that end part SS4 is located on the lowermost side in downward sealing member S4.

Figure 4:
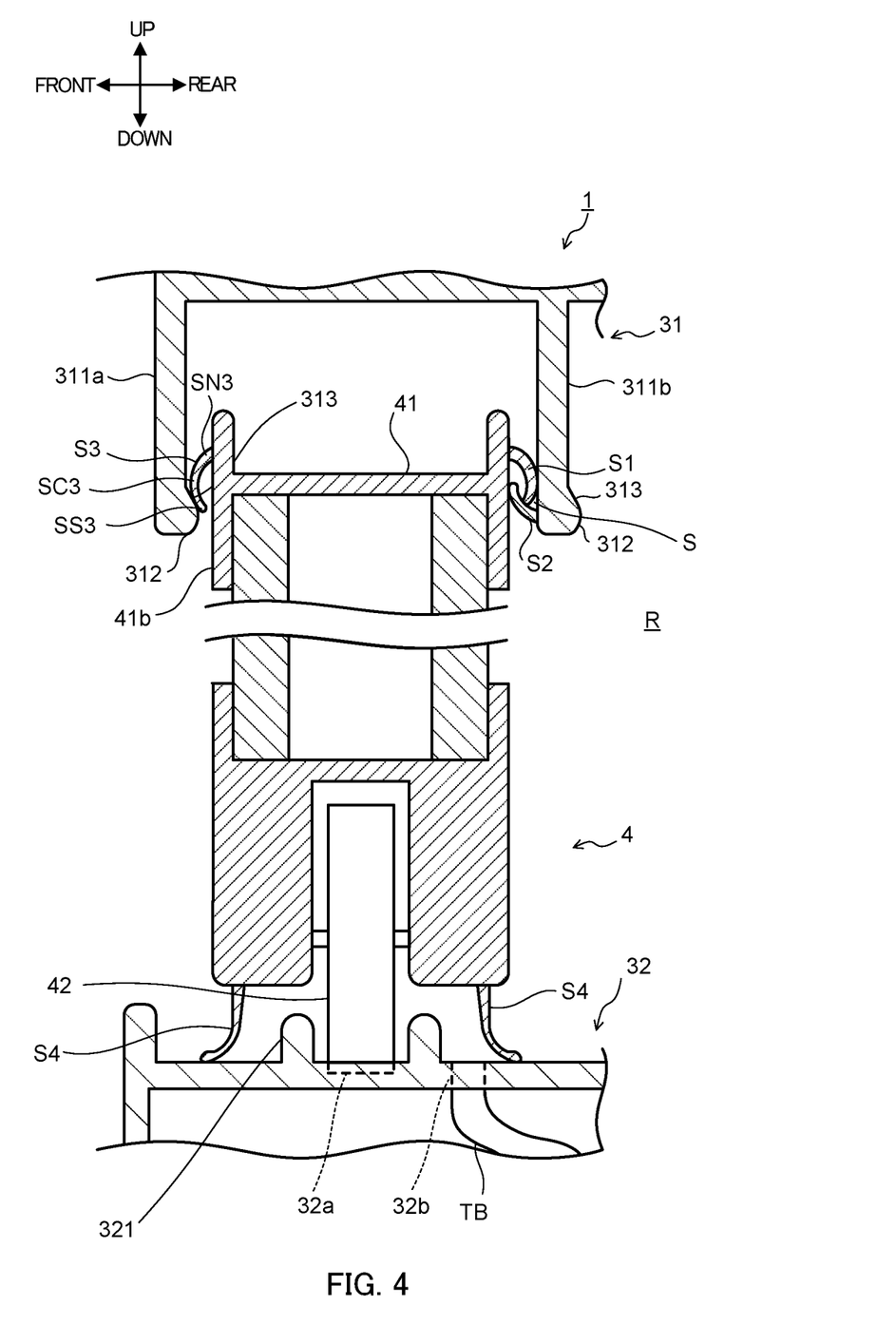
FIG. 4 is a cross-sectional view of the refrigerator according to the present disclosure, in a state where the sliding door is located at a fully closed position.

Next, operations of sealing members S1, S2, S3 and S4 are described with reference to FIGS. 2, 3, and 4. FIG. 4 is a cross-sectional view of refrigerator 1 according to the present disclosure, in the state where outer sliding door 4 is at the fully closed position. Note that as illustrated in FIG. 3, when outer sliding door 4 is at an open position, upward inner sealing member S1 and upward outer sealing member S3 are not in contact with upper frame 31. In addition, auxiliary sealing member S2 is not in contact with outer sliding door 4. Further, downward sealing member S4 is not in contact with lower frame 32.

As illustrated in FIG. 2, when outer sliding door 4 located at the open position moves in the closing direction, wheel 42 is brought closer to tilted surface 32aa of lowering part 32a and lowered into lowering part 32a along tilted surface 32aa. As a result, as illustrated in FIG. 4, outer sliding door 4 is lowered to the lower side and located at the fully closed position, and refrigeration compartment R is sealed by sealing members S1, S2, S3 and S4.

Operations of Upward Inner Sealing Member S1 and Auxiliary Sealing Member S2

When wheel 42 is guided in the downward direction by tilted surface 32aa of lowering part 32a, first, end part SS1 of upward inner sealing member S1 makes contact with the inner peripheral surface of auxiliary sealing member S2.

Further, when outer sliding door 4 moves downward, end part SS1 of upward inner sealing member S1 receives a force from the inner peripheral surface of auxiliary sealing member S2. Specifically, a vertical compressing force is applied to upward inner sealing member S1. Then, upward inner sealing member S1 deforms to bulge to the outer peripheral surface side of upward inner sealing member S1, i.e., the rear side. As a result, the outer peripheral surface of upward inner sealing member S1 makes intimate contact with drooped part 311b of upper frame 31.

In addition, the inner peripheral surface of auxiliary sealing member S2 receives a force from end part SS1 of upward inner sealing member S1, and curved part SC2 of auxiliary sealing member S2 is pushed downward. Then, auxiliary sealing member S2 deforms to rotate around connecting part SN2. As a result, the outer peripheral surface of auxiliary sealing member S2 makes intimate contact with inner surface 41a of outer sliding door 4.

As illustrated in FIG. 4, when outer sliding door 4 reaches the fully closed position, upward inner sealing member S1 and auxiliary sealing member S2 make intimate contact with each other to engage with each other, or more specifically, end part SS1 and the inner peripheral surface of auxiliary sealing member S2 make intimate contact with each other.

Note that when outer sliding door 4 is at an open position, outside air may intrude into the space between the upper side of sash 41 of outer sliding door 4 and upper frame 31 from a gap between drooped part 311a and upward outer sealing member S3. When the intruded air is cooled by the cold air inside refrigeration compartment R, condensation may occur on the upper side of sash 41 of outer sliding door 4 and upper frame 31. The condensation water adhered on the surface of drooped part 311b on outer sliding door 4 side falls into gap S formed by auxiliary sealing member S2 and drooped part 311b. In addition, the condensation water adhered to inner surface 41a of outer sliding door 4 flows into gap S along the outer peripheral surface of upward inner sealing member S1. The condensation water entered gap S is guided toward the vertical frame of frame body 3, goes toward lower frame 32 along the vertical frame, and flows into guiding port 32b of lower frame 32. Thereafter, the condensation water is guided into the machine compartment through pipe TB to flow into a receiving pan in the vicinity of a condenser in the machine compartment, and is evaporated by the heat of the condenser.

Operation of Upward Outer Sealing Member S3

When wheel 42 is being guided downward by tilted surface 32aa of lowering part 32a, end part SS3 of upward outer sealing member S3 makes contact with tilted surface 32aa of protruding part 312. Further, when outer sliding door 4 moves downward, end part SS3 of upward outer sealing member S3 is guided to the lower side by tilted surface 32aa, and end part SS3 enters the space between protruding part 312 and outer sliding door 4. Then, a compressing force is applied to upward outer sealing member S3 in the vertical direction and the front-rear direction. As a result, as illustrated in FIG. 4, a state where the outer peripheral surface of upward outer sealing member S3 is in intimate contact with protruding part 312 is set.

Operation of Downward Sealing Member S4

When wheel 42 is being guided downward by tilted surface 32aa of lowering part 32a, end part SS4 of downward sealing member S4 makes contact with the top surface of lower frame 32. Further, when outer sliding door 4 moves downward, the outer peripheral surface of end part SS4 of downward sealing member S4 receives a force from lower frame 32. Specifically, a vertical compressing force is applied to downward sealing member S4. This causes a deformation such that the curvature radius of curved part SC4 decreases. As a result, as illustrated in FIG. 4, a state where the outer peripheral surface of end part SC4 is in intimate contact with the top surface of lower frame 32 is set.

Note that two downward sealing members S4 operate in the same manner.

Upward inner sealing member S1, upward outer sealing member S3, and downward sealing member S4 are also attached to inner sliding door 5. In addition, auxiliary sealing member S2 is provided at the innermost drooped part. These sealing members S1, S2, S3 and S4 operate in the same manner as sealing members S1, S3 and S4 attached to outer sliding door 4 and auxiliary sealing member S2 attached to drooped part 311b.

Each of sealing members S1, S2, S3 and S4 provided in refrigerator 1 according to the present embodiment does not make intimate contact between outer sliding door 4 and frame body 3 when outer sliding door 4 is at an open position, but makes intimate contact between outer sliding door 4 and frame body 3 when outer sliding door 4 reaches the fully closed position. Thus, outer sliding door 4 can be moved to the fully closed position with a small force, and refrigeration compartment R can be reliably sealed at the fully closed position.

In addition, upward inner sealing member S1, auxiliary sealing member S2, upward outer sealing member S3, and downward sealing member S4 have an arch vertical cross-sectional shapes, and therefore can be readily elastically deformed both in the vertical direction and the front-rear direction in the vertical plane. Accordingly, each of sealing members S1, S2, S3 and S4 is less prone to damage even when outer sliding door 4 is lowered and moved downward and it receives any forces in the vertical plane. In addition, upward inner sealing member S1, upward outer sealing member S3, and downward sealing member S4 are disposed such that their end parts are located on the lowermost side and that their attaching parts are located on the uppermost side, and thus when outer sliding door 4 is lowered, the position separated from attaching part makes contact with the intimate contacting object. In other words, the impact of the lowering of wheel 42 of outer sliding door 4 is received at the position separated from the attaching part. In this manner, the attaching part less directly receives the impact of the lowering of the wheel, and upward inner sealing member S1, upward outer sealing member S3, and downward sealing member S4 are less peeled from the attached object. Thus, it can be said that upward inner sealing member S1, upward outer sealing member S3, and downward sealing member S4 are resistant to the impact of the lowering of outer sliding door 4.

The vertical cross-sectional shape of auxiliary sealing member S2 is an arch shape, and auxiliary sealing member S2 is disposed such that end part SS2 is located on the uppermost side and that attaching part SN2 is located on the lowermost side. Thus, gap S is formed together with drooped part 311b, and the condensation water adhered to frame body 3 can be received. In addition, auxiliary sealing member S2 is disposed such that gap S are formed, by drooped part 311b and auxiliary sealing member S2, between outer sliding door 4 and drooped part 311b. Therefore, when outer sliding door 4 is open, the condensation water due to the outside air intruded to a region near refrigeration compartment R than outer sliding door 4, especially the condensation water adhered to drooped part 311b, flows into gap S. Thus, the entry of the condensation water into refrigeration compartment R can be more reliably prevented.

End part SN2 of auxiliary sealing member S2 is closer to outer sliding door 4 than end part SN1 of upward inner sealing member S1. Therefore, the condensation water adhered to the upper part of outer sliding door 4 flows into gap S along the outer peripheral surface of upward inner sealing member S1. Thus, the condensation water adhered to not only frame body 3, but also outer sliding door 4 can be prevented from entering refrigeration compartment R.

Guiding surface 313 that guides end part SS3 to the lower side is formed in protruding part 312 of drooped part 311a, and thus upward outer sealing member S3 easily intrudes into the space between protruding part 312 and outer sliding door 4. As a result, upward outer sealing member S3 acts to return to a natural state from an elastically deformed state, and upward outer sealing member S3 is pushed against and brought into intimate contact with drooped part 311a. Therefore, upward outer sealing member S3 strongly makes intimate contact with upper frame 31.

End part SS4 of downward sealing member S4 has a swelled shape. Thus, end part SS4 has a high rigidity. Therefore, the straight line shape of end part SS4 is easily maintained along the extending direction of downward sealing member S4, i.e., the horizontal direction. In this manner, end part SS4 can make intimate contact with lower frame 32 with an even force linearly from the left end to the right end of downward sealing member S4. In addition, with the high rigidity, end part SS4 is not bent or undulated even when it is used for a long period. Thus, end part SS4 can stably make intimate contact with lower frame 32 for a long period.

Refrigerator 1 includes upward outer sealing member S3 between upper frame 31 and outer surface of 41b of outer sliding door 4. In this manner, when outer sliding door 4 is at the fully closed position, the outside air does not enter the space between upper frame 31 and the upper end of outer sliding door 4. Thus, the generation of condensation in the space between the upper end of outer sliding door 4 and upper frame 31 can be suppressed. Refrigerator 1 includes upward inner sealing member S1 and auxiliary sealing member S2 between upper frame 31 and inner surface 41a of outer sliding door 4, and thus, even when condensation is generated in the space between the upper end of outer sliding door 4 and upper frame 31, the entry of the condensation water into refrigeration compartment R can be prevented.

In addition, refrigerator 1 includes downward sealing member S4 between lower frame 32 and the bottom surface of outer sliding door 4, and in front of sliding door guide part 321. In this manner, when outer sliding door 4 is at the fully closed position, the outside air does not enter the space between the lower end of outer sliding door 4 and lower frame 32. Thus, the generation of condensation in the space between lower frame 32 and the lower end of outer sliding door 4 can be suppressed. Refrigerator 1 includes downward sealing member S4 between the bottom surface of outer sliding door 4 and lower frame 32, and on the rear side of sliding door guide part 321, and thus even when condensation is generated in the space between the lower end of outer sliding door 4 and lower frame 32, entry of the condensation water into refrigeration compartment R can be prevented.

Since entry of the condensation water into refrigeration compartment R can be minimized with sealing members S1, S2, S3 and S4, the environment of the interior of refrigeration compartment R can be appropriately maintained.

When refrigeration compartment R is cooled and the pressure inside refrigeration compartment R becomes smaller than the pressure of the space between the upper end of outer sliding door 4 and upper frame 31, upward inner sealing member S1 is pushed downward by the pressure of the space between the upper end of outer sliding door 4 and upper frame 31. When upward inner sealing member S1 is pushed downward, the force of pushing auxiliary sealing member S2 by upward inner sealing member S1 is increased, and therefore the outer peripheral surface of auxiliary sealing member S2 is more strongly pushed against outer sliding door 4.

In addition, when the air of the space between the upper end of outer sliding door 4 and upper frame 31 is cooled and its temperature is reduced, the pressure of the space between the upper end of outer sliding door 4 and upper frame 31 tends to be smaller than the pressure of the outside air. When the pressure of the space between the upper end of outer sliding door 4 and upper frame 31 becomes smaller than the pressure of the outside air, upward outer sealing member S3 is pushed upward by the pressure of the outside air. When upward outer sealing member S3 is pushed upward, the outer peripheral surface of curved part SC3 of upward outer sealing member S3 is strongly pushed by drooped part 311a.

Further, since the temperature of the air of the space between the lower end of outer sliding door 4 and lower frame 32 tends to be smaller than that of outside air, the pressure of the space between the lower end of outer sliding door 4 and lower frame 32 tends to be smaller than the pressure of the outside air. When the pressure of the space between the lower end of outer sliding door 4 and lower frame 32 becomes smaller than the pressure of outside air, downward sealing member S4 located on the front side than wheel 42 is pushed rearward. When downward sealing member S4 is pushed rearward, the outer peripheral surface of end part SS4 of downward sealing member S4 is strongly pushed by lower frame 32.

That is, it is possible to achieve a strong sealing property with sealing members S1, S2, S3 and S4 in the fully closed state.

This application is a continuation of International Patent Application No. PCT/JP2020/030916, filed on Aug. 14, 2020, the disclosure of which is incorporated herein by reference in its entirety. International Patent Application No. PCT/JP2020/030916 is entitled to (or claims) the benefit of Japanese Patent Application No. 2019-154912, filed on Aug. 27, 2019, the disclosure of which is incorporated herein by reference in its entirety.

INDUSTRIAL APPLICABILITY

The refrigerator according to the present disclosure is suitable for a refrigerator that is sealed by lowering the sliding door in the fully closed state. Therefore, its industrial applicability is very wide.

REFERENCE SIGNS LIST

1 Refrigerator
2 Housing
3 Frame body
31 Upper frame
311a, 311b Drooped part
312 Protruding part
313 Guiding surface
32 Lower frame
321 Sliding door guide part
32a Lowering part
32aa Tilted surface
32b Guiding port
4 Outer sliding door
5 Inner sliding door
41 Sash
41a Inner surface
41b Outer surface
42 Wheel
S1 Upward inner sealing member
SN1 Attaching part
SC1 Curved part
SS1 End part
S2 Auxiliary sealing member
SN2 Attaching part
SC2 Curved part
SS2 End part
S3 Upward outer sealing member
SN3 Attaching part
SC3 Curved part
SS3 End part
S4 Downward sealing member
SN4 Attaching part
SC4 Curved part
SS4 End part
R Refrigeration compartment
H Opening
TB Pipe
S Gap

The invention claimed is:

1. A refrigerator comprising:
a sliding door including a wheel;
a lower frame including a lowering part into which the wheel is lowered, the lower frame being configured to guide a lower side of the sliding door;
an upper frame configured to guide an upper side of the sliding door;
a first sealing member including a first attaching part and a first end part, the first attaching part being a portion attached to the sliding door; and
a second sealing member including a second attaching part and a second end part, the second attaching part being a portion attached to the upper frame, wherein:
a cross-sectional shape of the first sealing member taken along a plane perpendicular to a movement direction of the sliding door is an arch shape,
the first attaching part is located on an uppermost side in the first sealing member, and attached to a side face of the sliding door,
the first end part is located on a lowermost side in the first sealing member,
a cross-sectional shape of the second sealing member taken along the plane perpendicular to the movement direction of the sliding door is an arch shape,
the second attaching part is located on a lowermost side in the second sealing member, and attached to a side face of the upper frame,
the second end part is located on an uppermost side in the second sealing member, and
when the wheel is lowered in the lowering part, the first end part of the first sealing member makes intimate contact with an inner peripheral surface of the second sealing member at a first contact point and an outer peripheral surface of the first sealing member is in intimate contact with the side face of the upper frame at a second contact point spaced apart from the first contact point, and a gap is formed between the first contact point and the second contact point.

2. The refrigerator according to claim 1, wherein:
the upper frame includes a drooped part extending downwardly toward the lower frame, and
the second attaching part is attached to a side face of the drooped part.

3. The refrigerator according to claim 2,
wherein the second end part is located at a position closer to the sliding door than the first end part.

* * * * *